May 27, 1941.    A. F. NIELSEN ET AL    2,243,826
METHOD AND APPARATUS FOR TREATING SEWAGE AND INDUSTRIAL WASTE
Filed July 8, 1936    5 Sheets-Sheet 2

INVENTORS
AAGE F. NIELSEN
WILLIAM L. PAULISON JR.
BY Raymond D. Junkins
ATTORNEY May 27, 1941. A. F. NIELSEN ET AL 2,243,826
METHOD AND APPARATUS FOR TREATING SEWAGE AND INDUSTRIAL WASTE
Filed July 8, 1936   5 Sheets-Sheet 3

FIG. 3

INVENTORS
AAGE F. NIELSEN
WILLIAM L. PAULISON JR.
BY
ATTORNEY

May 27, 1941.   A. F. NIELSEN ET AL   2,243,826
METHOD AND APPARATUS FOR TREATING SEWAGE AND INDUSTRIAL WASTE
Filed July 8, 1936   5 Sheets-Sheet 4

INVENTORS
AAGE F. NIELSEN
WILLIAM L. PAULISON JR.
BY
ATTORNEY

Fig. 6

Patented May 27, 1941

2,243,826

UNITED STATES PATENT OFFICE 2,243,826

METHOD AND APPARATUS FOR TREATING SEWAGE AND INDUSTRIAL WASTE

Aage F. Nielsen, Red Bank, and William L. Paulison, Jr., Ridgewood, N. J.; said Paulison assignor to Bailey Meter Company, a corporation of Delaware Application July 8, 1936, Serial No. 89,576

13 Claims. (Cl. 210—2)

This invention relates to improved methods and apparatus for the treatment of sewage and industrial waste. It is more directly related to the chemical treatment of such waste liquors, as for example, the use of chemicals to accelerate the coagulation and flocculation of suspended or colloidal matter.

The invention deals particularly with the chemical-mechanical treatment of sewage, which is a distinctly controllable process not subject to biological phenomena or variables. Chemical treatment is strongest at some of the very points where the older processes are weakest. Biologic processes lack flexibility and positive means of control, while in chemical installations the dosage is readily varied to meet fluctuating demand and reserve capacity may be put into prompt service at full efficiency. The dosage can be adapted to kind and quantity of trade waste, readily handling many such materials as would seriously disturb a biologic plant. Odor control is more effective, partly due to the chemicals themselves, but also due to the much shorter retention time from raw inlet to effluent outlet. Chemical sludge is also more readily handled than biological residuum.

Some of the features of the invention are: the formation of a chemical precipitate to enmesh suspended matter mechanically; the absorption of impurities on the large area presented by the surface of the precipitated particles; coagulation of colloidal matter by neutralization of the electric charges; and alteration and control of the hydrogen ion concentration as expressed by the so-called pH number.

In the preferred process the raw sewage is first screened in the regular manner. The screened influent is then subjected to a 2-stage coagulating and flocculating treatment with simultaneous aeration. These treatments are carried out successively in a long tank, one end of which receives the sewage influent and the other end discharges into a thickener. A water solution of a soluble metal salt is added to the sewage as it enters the coagulating stage and prompt diffusion of the solution throughout the sewage is obtained by air agitation. The rate of flow of sewage through the coagulating stage is such as to give a detention period of about one hour. Milk of lime might then be added to the sewage and flocculation of the coagulated matter is promoted by air agitation. The detention period of the flocculating stage is about ten minutes.

The aim of this operation is to concentrate the suspended putrescible matter in a settlable sludge by introducing into the sewage an insoluble substance capable of collecting and carrying down the suspended matter, as for example, by precipitating iron hydroxide within the sewage. The precipitate of iron hydroxide, or equivalent metal base, and coagulate or entrained putrescible matter, is removed from the residual sewage in the form of a sludge. This sludge may be treated to destroy or otherwise appropriately dispose of the putrescible matter therein and to recover the metal content thereof. Thus the sludge may be dewatered or dehydrated and the resulting product roasted or incinerated to destroy the putrescible matter and to convert the ferric hydroxide to ferric oxide. The ferric oxide, or equivalent metal oxide, might then be treated with sulphuric acid to regenerate ferric sulphate. The residual and now clarified overflow from the settler, may be subjected to a final filtration such as sand filters, especially rapid sand filters, or a base exchange reaction, such as the zeolite process.

Prompt diffusion of the chemical solution throughout the mixture is produced by the agitation resulting from aeration. The oxygen in the air keeps the iron in the ferric condition. When a ferrous salt such as ferrous sulphate is employed, the oxygen of the air converts the iron to the ferric condition. Lime is preferable to other alkaline agents for the flocculation operation because it gives a denser floc and one which settles very rapidly and because it is inexpensive.

The pH number of the sewage is influenced by temperature and concentration and is also specific for different substances and wastes. It is the measure of potential acidity and alkalinity and indicates the electrical charge condition of the solution. Its indication and control become important, not only relative to coagulation and flocculation, but also as to the settlability and filterability. In particular we have found that the filterability of the liquid is the thing that determines the pH at which the liquor must be held, and that the iron salts, such as the sulphates and chlorides, are efficient coagulants in fairly wide pH ranges.

The chemical treatment of a uniform flow of sewage at a constant condition would be comparatively simple. However, the quantity and characteristics of the flow are continuously changing and it is to take care of the treatment of such a variable flow that our improved method and arrangement of apparatus is particularly effective. Some of the variables in regard to quantity and quality of the incoming sewage, which require great flexibility and adaptability in the apparatus and method of control by chemical treatment, are as follows:

1. The periodic and relatively unexpected dilution from storm water.
2. Marked hourly variations in composition because of the daily habits of the contributing population.
3. Variations from day to day in a week, as for example "wash day".
4. Seasonal temperature changes.
5. Seasonal food variations with canning, preserving, etc.
6. The discharge of industrial waste, cyclic as for week days relative to week-ends, day and night, etc.; and with unexpected and sudden variations.

For example, it is known that the composition and characteristics of sewage waste of a city varies quite definitely over the course of a day and of a week. In the early morning human waste products usually predominate, while at noon and in the early evening there is a larger percentage of cooking waste. On a certain day of the week wash water will form a considerable portion of the total. Industrial waste will vary day from night and between the days of the week. In a given locality we may determine an average expected cycle of quantity and characteristics of the flow for each hour of the day and for each day of the week. Such cyclic information may be obtained by observation and test prior to the installation of chemical treatment apparatus and later continuously checked during operation of the system.

We have found that it is primarily desirable to proportion the feed of chemical solution directly to the flow of sewage, but that it is equally desirable to vary the proportionality in accordance with both the quantity and character of the flow. After determining the expected quantity and character of the flow hour by hour for a period of a week, we are able to establish desired proportionality between chemical and sewage flow for each hour of the week. Cams (to be rotated once in seven days) may be cut according to such information.

During subsequent operation, if it is found that the character and flow of sewage for a certain part of the day or week differs, then the contour of the cam may be changed from time to time as found necessary.

A principal object of the invention is to provide apparatus for automatically proportioning chemical solution in accordance with the instantaneous rate of flow of sewage liquor or other waste matter to be treated.

Another object is the provision for automatically varying the proportion of chemical to sewage in accordance with predetermined desirable relationship and conditions.

A further object is to continually check between expected rate of sewage flow and actual rate of sewage flow and to readjust the proportionality of chemical solution to sewage flow when such ratio departs.

A still further object is to continually determine the pH value of the flowing material and utilize such determination as a readjusting factor in proportioning chemical solution to the sewage flow, or for the adding of another chemical.

Numerous other features and objects of our invention will become apparent through a study of the drawings and of the specifications, in which we have clearly described a preferred embodiment of the invention.

Figure 1:
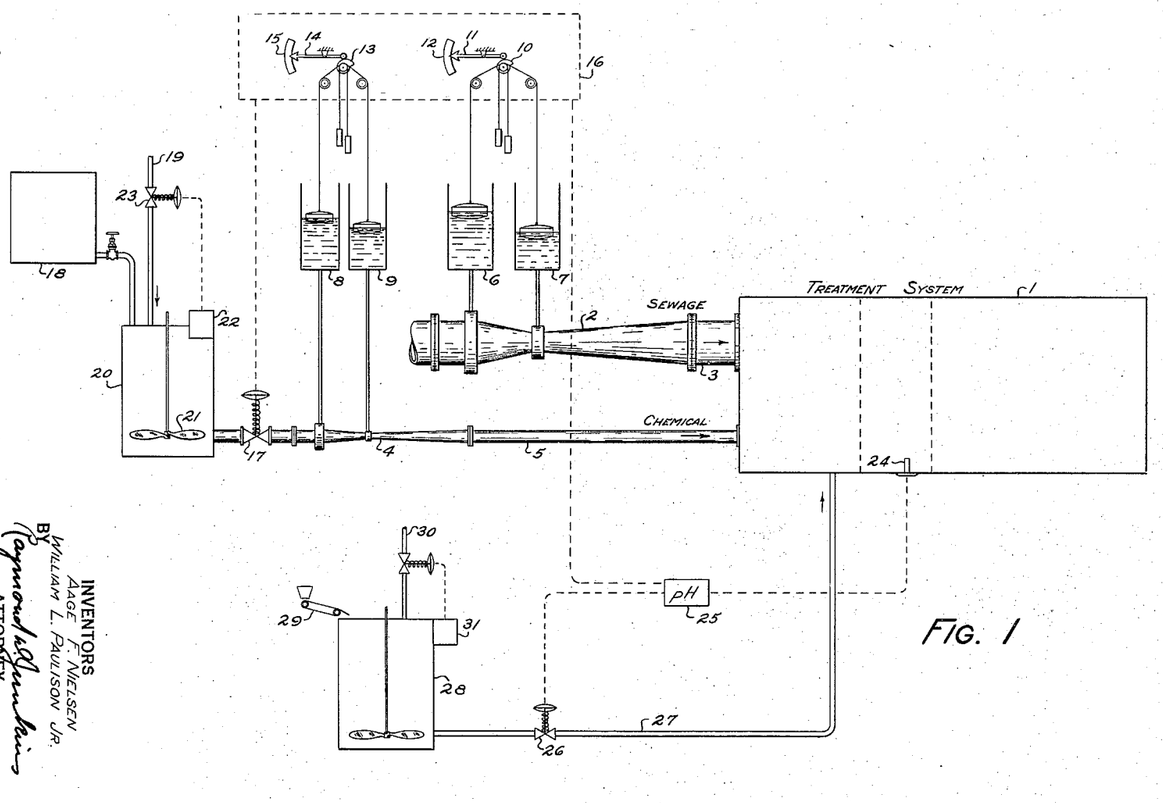
Fig. 1 is a diagrammatic layout of one embodiment of our invention.

Referring first to Fig. 1, we illustrate at 1 a mixing tank for the mixing and aeration of raw sewage and chemical solution. It is not necessary to show this in detail, for the actual shape and construction may vary widely dependent upon local conditions and quantity flow. Preferably the mixing tank may comprise several sections, to one of which the raw sewage is introduced and to the same or another of which the chemical solution is introduced. Preferably some aeration occurs prior to the introduction of the chemical solution. At another point in the assembly we illustrate the introduction of a second chemical and at still another point the determination of the pH value of the mixture.

The numeral 2 designates a Venturi tube in the raw sewage conduit 3, and the numeral 4 a Venturi tube in the chemical solution conduit 5. Float tubes 6, 7 are in operative relation to the Venturi tube 2; as are the float tubes 8, 9 to the Venturi tube 4.

A cam 10 is angularly moved responsive to the pressure differential in the float tubes 6, 7 and serves to position an indicator arm 11 relative to an index 12 to read directly the rate of sewage flow. Similarly a cam 13 continually positions an indicator arm 14 relative to an index 15 to advise the instantaneous rate of chemical solution flow. It is, of course, understood that the proper gear reductions, differentials, etc. are incorporated in the mechanism positioning the cams 10 and 13. The important thing is that the arm 11 is positioned directly in accordance with rate of sewage flow and that the arm 14 is positioned directly in accordance with the rate of chemical solution flow.

Figure 2:
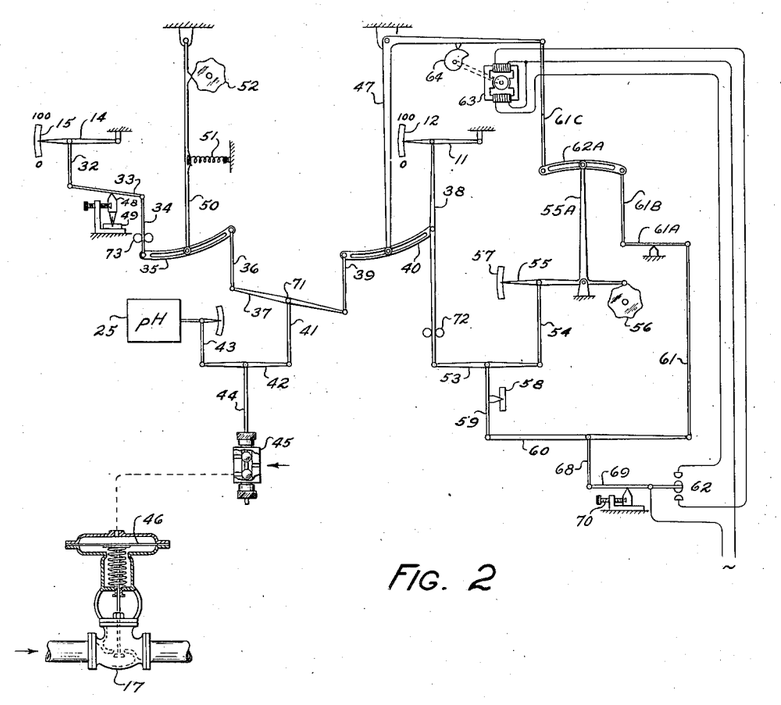
Fig. 2 is a diagrammatic, developed showing of a portion of Fig. 1.

By the dotted outline 16 we indicate a meter and control assembly, shown in greater detail at Fig. 2, actuated by and in accordance with the rate of flow of sewage and of chemical solution. From the interrelation of these two rates of flow we preferably control a spring-loaded diaphragm-actuated control valve 17 located in the chemical solution conduit 5 for the control of flow therethrough. Thus the rate of feed of the chemical solution is controlled in desirable proportionality to the rate of flow of the sewage, as will be fully explained with reference to Fig. 2.

We show at 18 a tank of concentrated chemical solution in which the specific gravity of the solution may not necessarily be constant. At 19 we indicate a fresh water supply pipe. The chemical solution and fresh water are led to a mixing tank 20, continually being stirred by a mixer 21. The specific gravity of the chemical solution in the mixing tank 20 is continuously checked by a specific gravity recorder-controller 22 which actuates the control valve 23 to proportion the fresh water as a diluent of the chemical from the tank 18. The specific gravity recorder 22 is not shown in detail, as it may be of any known type, such for example as that disclosed and claimed in the patent to Bailey 1,546,702. The general purpose of the arrangement, of course, being that the solution flowing through the conduit 5 will be of constant determined specific gravity and other character.

At 24 we indicate the sensitive cell of a pH determining apparatus 25, which may tie in with the assembly 16 in the control of the valve 17, or may directly position the valve 26 to regulate the supply of a further chemical solution or suspension through the conduit 27.

The liquid flowing through the conduit 27 may, for example, be a milk of lime suspension coming from a mixing tank 28 to which the lime may be fed by a dry feeder 29, and to which fresh water may be fed through a pipe 30, the flow of the latter under the continuous control of a specific gravity recorder 31.

Referring now to Fig. 2, we have shown here a developed diagrammatic arrangement of the linkage directly under the control of the arm 11 (responsive to rate of sewage flow) and of the arm 14 (responsive to the rate of flow of chemical solution), as well as responsive to the pH device 25, for positioning the regulating valve 17.

The arm 14, positioned in accordance with actual rate of chemical solution flow, in turn positions one end of a beam 37 through the intermediary of links 32, 34, 36 and beams 33, 35. The arm 11, positioned representative of actual sewage flow, is adapted to position the other end of the beam 37 through the intermediary of links 38, 39 and of beam 40.

Intermediate the ends of the beam 37, and positioned thereby, is a vertical link 41 adapted to move one end of a beam 42, the other end of which is positioned through a link 43 by the pH meter 25. The beam 42 is adapted to vertically position the stem 44 of a pilot valve assembly 45 for controlling a pressure fluid, such as air, effective upon the diaphragm 46 for controlling the opening of the valve 17.

The pilot valve 45 is of a type wherein the loading pressure effective upon the diaphragm 46 varies with the vertical positioning of the stem 44. Such a valve is disclosed and claimed in the copending application of Clarence Johnson, Serial No. 673,212. In the present arrangement the pressure fluid (air) is available as indicated by the arrow from any convenient source of supply and is preferably in the nature of compressed air at about 40 pounds per square inch gage.

It will be observed that in general the valve 17 is controlled according to the proportionality existing between the rate of flow of raw sewage and the rate of flow of the chemical solution. In other words the pilot stem 44 is positioned according to the relative positions of the arms 11, 14. Should the flow of sewage decrease, the arm 11 will move counterclockwise, lowering the link 38 and moving the beam 40 in clockwise rotation around a roller fulcrum of the bell crank 47. This in turn lifts the links 39, 41 and stem 44 to the end that air pressure effective upon the diaphragm 46 is decreased and the valve 17 tends to close, thus decreasing the rate of supply of chemical solution in desired proportion to the decrease in rate of flow of sewage. Such decrease in flow of chemical solution through the venturi 4 causes a counterclockwise movement of the arm 14 with consequent lowering of the links 32, 36, 41 and stem 44 until a state of equilibrium of the system is attained.

We provide at 48 a movable fulcrum for the beam 33 so that the operator may adjust the basic proportionality between sewage and chemical flow and which proportionality may be indicated on an index 49. It will be observed that the ratio of chemical to sewage flow may readily be varied by movement of the fulcrum 48 along the beam 33, thus varying the relation of vertical movement of the links 32, 34. We further provide a movable fulcrum for the beam 35, constituting a roller moving in a slot of the beam 35. The roller is at the lowermost end of a bar 50, which is pivotally suspended at its uppermost end and urged to move in counterclockwise direction by a tension spring 51. The actual position of the bar 50 is determined by its contact with a continuously rotating cam 52. The cam 52 is preferably cut to a shape determined by experimental data for the particular installation, and preferably rotates once in seven days having a contour adapted to all of the hours of each of the seven days. The contour represents the desired ratio of chemical solution to sewage flow, experimentally determined on the basis of quantity and character of the sewage hour by hour. Thus the position of the bar 50 and correspondingly of the fulcrum of the beam 35 may be different at 7:00 a. m. Monday morning than at 4:00 p. m. on Friday. In fact, it may change throughout all the time interval of a period of seven days.

While we have described the cam 52 as being designed in accordance with predicted rate of sewage flow over the period of seven days, it is not necessary that this be strictly adhered to. For instance, it might be designed for the period of one day, or of a period of longer than seven days. The cam is continually moved in rotation by any standard clock work, or constant speed motor, and serves to continuously control proportionality of chemical to sewage flow in cyclic manner dependent upon predetermined desirable proportionality according to determined rate and character of sewage flow.

Occasionally there may be a material variation from expected rate of sewage flow, such for example as may be caused by a sudden rain storm. When such condition exists it may be desirable to vary the proportionality between chemical and sewage flow, as for example, to decrease the proportion of chemical if large volumes of rain water are in the sewage flow. To take care of such a condition we have provided a means of interrelating expected sewage flow and actual sewage flow to cause a shifting of the fulcrum of the beam 40 in direction and amount to desirably control the proportionality of chemical to sewage flow. The link 38 is adapted to position one end of a beam 53, the other end of which is positioned by a link 54. The link 54 is continually positioned through an arm 55 by a cam 56. The cam 56 may make a revolution in one day or several days. It is continuously moved in rotation and serves to position the arm 55 in accordance with expected rate of sewage flow. Such rate may be indicated by the arm 55 upon an index 57. At 58 we indicate an index from which may be read the relation between actual and expected rate of sewage flow.

The beam 53 is adapted to vertically position a link 59 pivotally connected to one end of a beam 60. The other end of the beam 60 is positioned by a link 61, in turn under the control of the bell crank 47. The beam 60 is adapted to position a contactor 62 to control a reversing motor 63; through the intermediary of a link 68 and beam 69, the latter having an adjustable fulcrum 70.

The motor 63 is adapted to drive a cam 64 through proper gear reduction, in one direction or the other, according to the dictates of the contactor 62. Movement of the cam 64 positions the bell crank 47, thus varying the moment arms of the beam 40 and at the same time repositioning the contactor 62 through the link 61.

Proper direction and amount of movement of the link 61 is accomplished through the agency of a fulcrumed beam 61A, links 61B, 61C and a slotted beam 62A. The latter has a movable fulcrum, namely the roller end of a bell crank arm 55A positioned by and with the indicator 55.

It will be observed that the vertical positioning of the link 41 is in accordance with a prearranged ratio of chemical to sewage flow through the hand adjustment 48, the actual rate of flow of the chemical and of the sewage, the dictates of a cyclic cam 52, and the relation between expected and actual rates of sewage flow.

The linkage of Fig. 2, is shown in position corresponding to a sewage flow and a chemical flow, each approximately 50%. So long as desired proportionality between the flows is maintained, the pivot point 71 of beam 37 remains unmoved. The beams 35 and 40 are so designed that at zero flow of both sewage and chemical, the rollers of arms 50 and 47 may move throughout the arc of the respective slots without causing a vertical movement of link 41. Rollers 72 for arm 38 and rollers 73 for arm 34 guide the arms in substantially vertical travel.

The pilot valve stem 44 is not only under the control of the link 41, but is additionally subject to the actual pH value to which the cell 24 is sensitive.

It will be observed that various hand adjustments are provided and that numerous indexes allow the operator to readily observe the instantaneous value of the rate of flow, as well as ratios, etc. of the system. It is apparent that the arms 11, 14 may be moved around a common axis in the assembly 16 and that they may indicate relative to a single index for ready comparison of actual rate of flow of chemical and of sewage. Furthermore, that the arms 11, 14 may include marking pens to continuously record the actual rates of flow upon a record paper.

It is of course to be understood that the sewage meter may be connected to, or interrelated with, more than one chemical flow meter. For example, we may have two or more separate and distinct chemical supply flows, each with a flow meter, and the plurality of chemical flow meters cooperate with a single sewage flow meter. Conversely, a single chemical flow meter may cooperate with a plurality of sewage flow meters.

Figure 3:
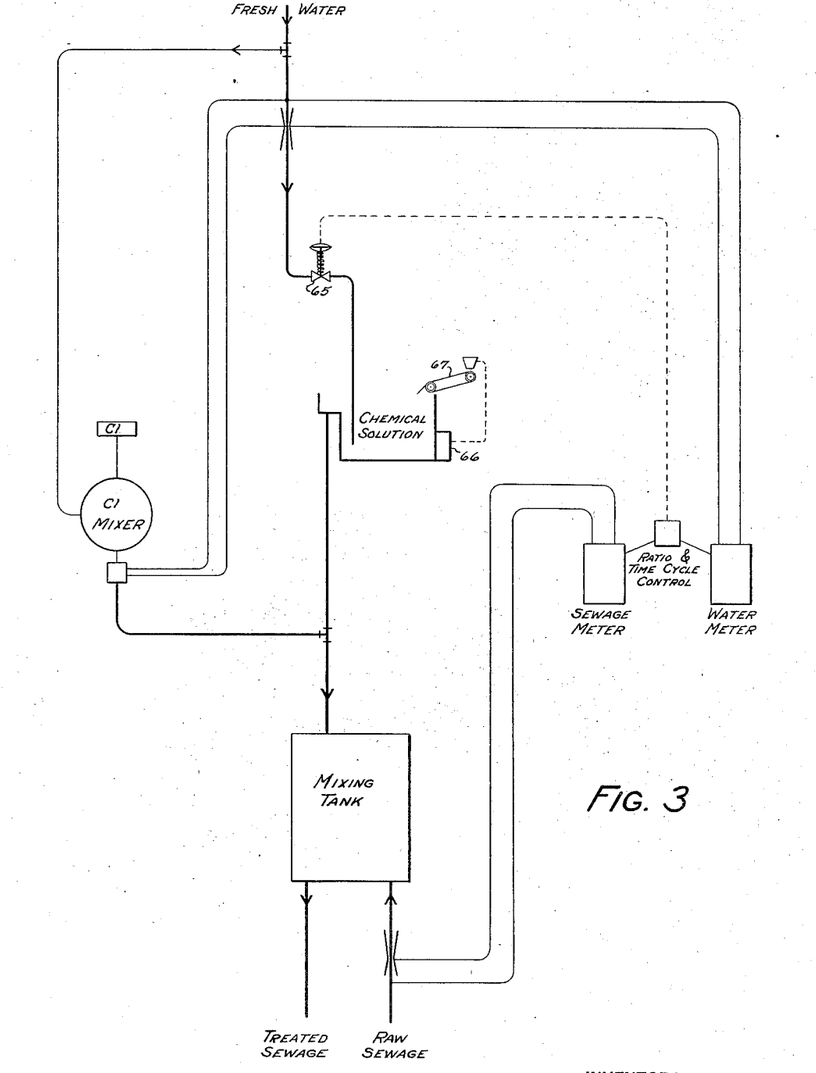
Fig. 3 illustrates in diagrammatic fashion a further embodiment of the invention.

At Fig. 3 we show a slight modification of the embodiment we have described. Herein the ratio and time cycle control is under the influence of a sewage meter and of a fresh water meter. The interrelation of these two rates of flow and of time cycling equipment, such as described in connection with Fig. 2, is effective in positioning a valve 65 in the fresh water supply to the chemical solution. A gravity recorder 66, sensitive to the solution in the tank, is adapted to control the dry feeder 67. The chemical tank may be of the overflow type, so that the rate of flow therefrom is dependent upon the height of solution above the overflow, with the rate of water supply to the tank controlled in desired proportion to the sewage flow, and with the dry chemical feed to the tank controlled according to the gravity of the solution in the tank.

The measurement of fresh water (in desired ratio to the flow of sewage) is utilized to control the flow of chlorine solution to the mixing tank.

Figure 4:
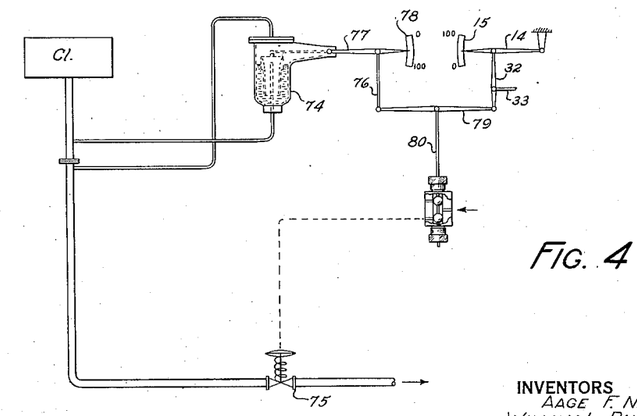
Fig. 4 illustrates a modification of Fig. 3.

In Fig. 4 we illustrate a modification of Fig. 3 wherein the rate of flow of chlorine (either gas or liquid) is continuously measured by a flow meter 74 and controlled by a valve 75, directly in accordance with rate of chemical feed. We illustrate the flow meter 74 adapted to vertically position a link 76 pivotally suspended from an indicator arm 77 which moves relative to an index 78 to visually advise the rate of chlorine flow.

The link 32, positioned vertically in accordance to rate of chemical supply, has been extended below its pivotal connection to the beam 33 and pivotally joins one end of a beam 79. The other end of the beam 79 is pivoted to the lower end of the link 76.

Intermediate the ends of the beam 79 is suspended a pilot stem 80 controlling a pressure fluid such as air, for positioning the flow regulating valve 75 in the chlorine feed line. The assembly is such that the rate of flow of chlorine to the mixing tank is controlled proportionate to the rate of supply of chemical fed through the conduit 5.

Figure 5:
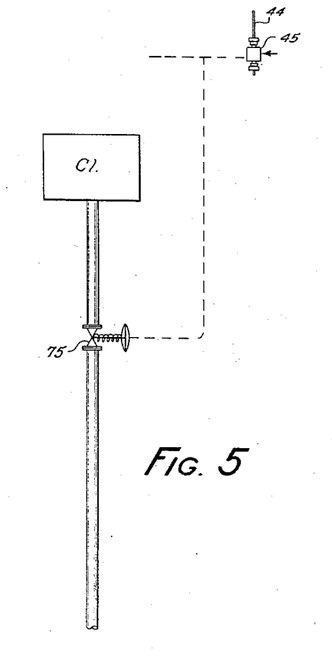
Fig. 5 is a further modification of Fig. 3.

In Fig. 5 we illustrate the control of the chlorine regulating valve 75 in parallel with the chemical control valve 17, both from the pilot valve 45. Thus the chlorine is regulated, along with the other chemical, in relation to the sewage flow, chemical flow, time cycling, and pH value, as well as with the relation between actual sewage flow and expected sewage flow.

Figure 6:
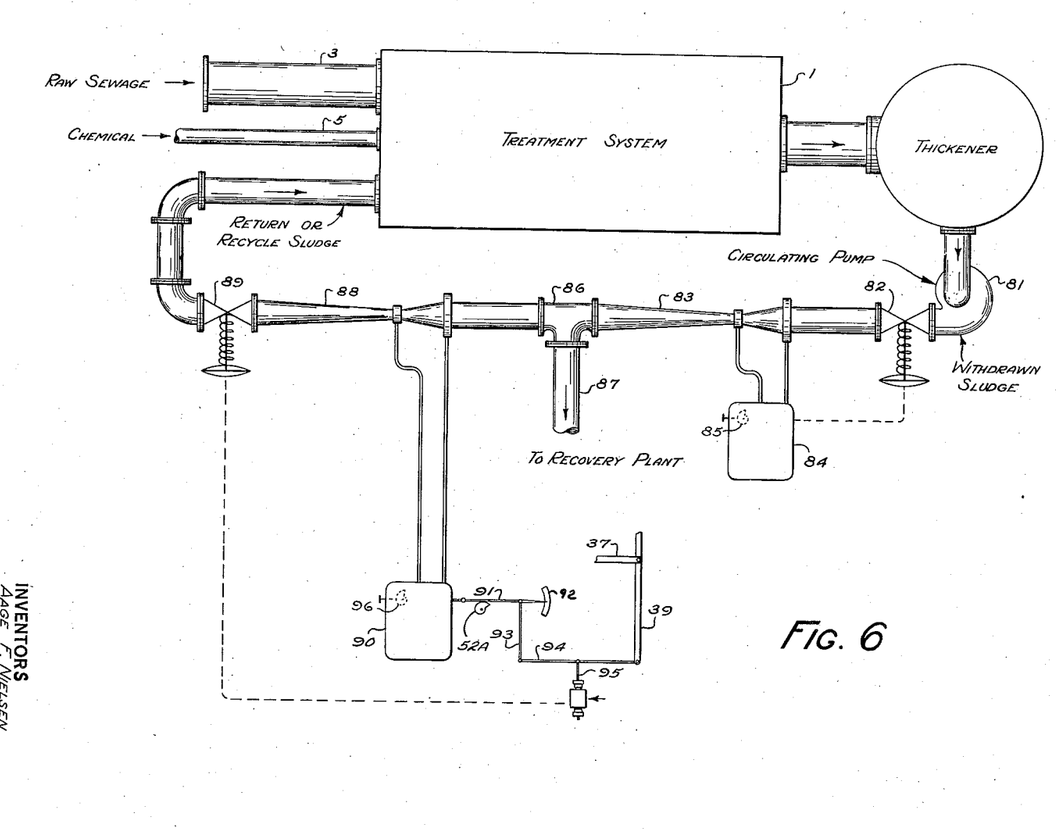
Fig. 6 illustrates a portion of our invention supplementary to the showing in Fig. 1.

Referring now to Fig. 6 we show that part of the system, additional to the general arrangement of Fig. 1, wherein a portion of the treated sludge is continually recycled to the inlet of the treatment system, and a portion is continually passed to the thickeners. During the course of a day the total pounds solids entering the plant may vary as much as 20 to 1, and as we desire to maintain the suspended solids in the treatment system as nearly uniform as is practical to minimize fluctuation in treatment it becomes evident that the returned, or recycled, sludge should be held substantially uniform and that the waste or sludge going to the recovery plant should vary decidedly.

We desirably withdraw sludge from the final settlers as a continuous flow; a portion of which is returned to the mixing tank to recycle and the remainder (waste sludge) is delivered to the thickeners. The suspended solids in the raw sewage seems to vary directly with rate of raw sewage flow, and it is preferable to control the waste sludge flow so that solids will be removed from the system at the same rate at which they are added in the raw sewage flow to keep the circulating system in a more uniformly treatable condition.

The amount of withdrawn sludge is kept substantially constant over the day in gallons per minute and the amount of sludge wasted will at all times correspond to the amount of solids in the raw sewage. We, therefore, keep a condition in the mixing tank independent of the momentary raw sewage quality. As the volume of recycle sludge is at all times larger than that of the waste sludge, the variation in the recycle sludge is far less than in the waste sludge, which corresponds substantially to the variation in raw sewage solids.

In Fig. 6 we illustrate a preferred embodiment wherein a constant flow control is used in connection with the withdrawn sludge. Control of the recycle sludge is from a relation of its metered value to the metered value of the raw sewage entering the plant, as well as to the ratio between metered raw sewage and expected raw sewage. The difference between the withdrawn sludge and the recycle sludge goes to the thickeners.

Sludge is withdrawn from the final settler by a circulating pump 81 from which it passes through a regulating valve 82 and thence through a flow metering device indicated as a Venturi tube 83. A meter 84 is sensitive to the differential pressure created by the Venturi tube 83 and is adapted to continuously position a pilot valve similar to the pilot valve 45 (Fig. 2) to establish an air loading pressure effective in positioning the regulating valve 82. The meter 84 is provided with a hand adjustable cam 85 through whose agency the rate of flow of withdrawn sludge may be varied. The operation is that the meter 84 and regulating valve 82 provide a constant flow control of the withdrawn sludge at a rate dependent upon the position of the cam 85.

From the Venturi tube 83 the withdrawn sludge passes to a T 86 having a branch connection 87 leading to the thickeners. The T 86 is also connected with a second Venturi tube 88 and a regulating valve 89, which latter is connected to the inlet of the treatment system.

A meter 90 is positioned responsive to the differential pressure existing across the Venturi tube 88 and continuously positions an indicator 91 relative to an index 92 to advise the rate of flow of recycle sludge. From the indicator 91 is suspended a link 93 pivotally connected at its lower end to one end of a floating beam 94. The other end of the floating beam 94 is pivotally connected to an extension of the link 39 (Fig. 2).

As previously explained, the link 39 is vertically moved in accordance with the actual rate of raw sewage flow as well as in accordance with the relation between actual raw sewage flow and expected raw sewage flow. Thus a pilot stem 95, pivotally suspended intermediate the ends of the beam 94, is positioned and controls the regulating valve 89 to maintain a rate of recycle sludge flow through the Venturi tube 88 in accordance with the actual raw sewage flow. In this manner the sludge passing through the conduit 87 to the recovery plant, namely, the difference between the flow through the Venturi 83 and the flow through the Venturi 88, is controlled to continuously remove from the system solids at a rate proportionate to the rate at which they enter the system in the raw sewage.

In general, the arrangement is such that the rate of recycle sludge follows a reverse curve of the flow of raw sewage. A hand actuated cam provision 96 is incorporated in the meter 90 for basically varying the effect of the rate of recycle sludge flow upon vertical positioning of the link 93 to shift the said recycle flow curve as a whole to a higher or lower value.

The cam 52A is driven with the cam 52 (Fig. 2) and may be identical therewith, or in fact, may be the same cam. Preferably cam 52A is shaped to automatically follow the "Suspended solids rate" curve, and may provide a means to control desired suspended solids rate constant or variable throughout any hour or time period.

Figure 7:
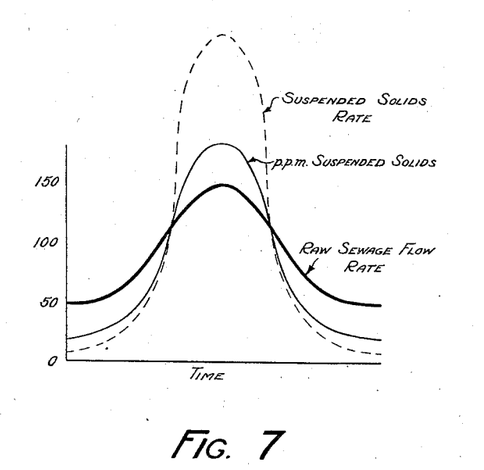
Fig. 7 is a graph of operations.

In Fig. 7 we illustrate typical expected curve shapes wherein the reference curve "Raw sewage flow" is shown to vary over a period of time. In reference to this the "p. p. m. suspended solids" follows generally the same shape. The "Suspended solids rate" curve is interrelated to the first two curves with corresponding greater range of variation.

A curve of "Withdrawn sludge flow rate" would be substantially a straight line. The "Wasted sludge flow" to the recovery plant would be of substantially the shape of the curve "Suspended solids," while the flow curve of the "Recycle or return sludge" would be substantially in reverse to the "Raw sewage flow."

Figure 8:
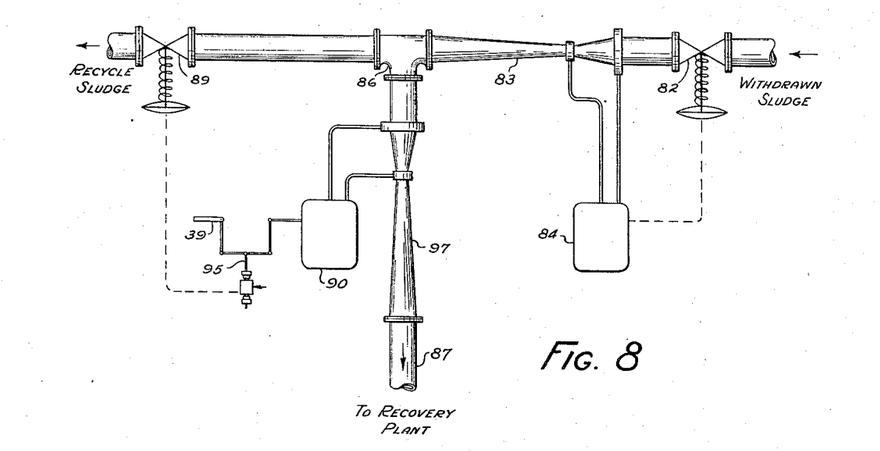
Fig. 8 is a modification of Fig. 6.

In Fig. 8 we illustrate a modification of the arrangement of Fig. 6, wherein a flow metering device shown as a Venturi tube 97 is inserted in the conduit 87 for measuring the rate of flow of sludge going to the recovery plant. The meter 90 sensitive to differential pressure across the Venturi tube 97, in conjunction with the arm 39, positions the pilot 95 for control of the regulating valve 89.

It will be understood that the modifications illustrated at Figs. 6 and 8 are by no means limiting, but that we may use any desired arrangement of metering and control apparatus to accomplish the desired operation of proportioning the recycle sludge and the sludge to the recovery plant in accordance with the rate of flow of raw sewage and to maintain the total solids in the treatment system in predetermined fixed or varying amount.

While we have illustrated and described certain preferred embodiments of our invention in connection with the chemical treatment of sewage or other waste liquors, it is to be understood that we are not to be limited thereto. For example, the arrangement of apparatus is equally adapted to the feeding of chemicals in a water purification and treatment system, or in fact to the proportioning of any fluids, which might for example be two gases, and where variables in the quantity and characteristic of flow occur in expected or unexpected relation to predetermined values.

What we claim as new, and desire to secure by Letters Patent of the United States, is:

1. A method of treating sewage and industrial waste comprising introducing thereto a chemical coagulant in predetermined proportion, and modifying such proportionality through an established time cycle.

2. A method of treating sewage and industrial waste comprising introducing thereto a chemical coagulant in predetermined proportion, modifying such proportionality through an established time cycle, and continuously controlling said proportionality responsive to an indication of a variable condition of the mixture.

3. In combination with apparatus for purifying sewage and industrial waste, a conduit through which the raw waste flows to the apparatus, a meter to measure the said raw waste flow, a conduit through which a chemical solution flows to the apparatus, a meter to measure the flow of said flow chemical solution, a regulating valve for the chemical solution, means controlled by said meters for positioning said valve, and a time cycle apparatus for modifying the control of said last named means by said meters.

4. In combination with apparatus for purifying sewage and industrial waste, a mixing tank, means supplying raw waste to the tank, means supplying a treatment chemical to the tank, and time cycle means for controlling the proportioning of metered chemical flow to metered waste flow.

5. In combination with apparatus for purifying sewage and industrial waste, a mixing tank, means supplying raw waste to the tank, means supplying a treatment chemical to the tank, time cycle means for controlling the proportioning of metered chemical flow to metered waste flow, and means sensitive to the pH value of the mixture at a stage of the treatment controlling the introduction of a second chemical to the mixture.

6. In combination with apparatus for purifying a polluted liquid, a conduit through which the polluted liquid flows to the apparatus, a meter to measure the flow of polluted liquid, a conduit through which a chemical solution flows to the apparatus, a meter to measure the flow of chemical solution, a regulating valve of the flow of chemical solution, and means controlled by said meters for positioning said valve.

7. In combination with apparatus for purifying a polluted liquid, a conduit through which a chemical solution flows to the apparatus, means for maintaining a constant rate of flow of the chemical solution to said apparatus, and cyclically operable means for varying the constant rate maintained by said last named means through a predetermined program.

8. In combination with apparatus for purifying a polluted liquid, a conduit through which a chemical solution flows to the apparatus, means for maintaining a constant rate of flow of the chemical solution to said apparatus, and means for varying the constant rate maintained by said last named means through a predetermined program.

9. In combination with apparatus for purifying a polluted liquid, means for introducing a chemical into said polluted liquid, means for measuring the rate at which the chemical is introduced into said polluted liquid, regulating means under the control of said last named means for maintaining a constant rate of chemical introduction into said polluted liquid, and means for varying the constant rate of introduction maintained by said last named means in accordance with a measure of the polluted liquid to be treated.

10. In combination with apparatus for purifying a polluted liquid, a conduit through which the polluted liquid flows to the apparatus, a meter to measure the flow of polluted liquid, a conduit through which a chemical solution flows to the apparatus, a meter to measure the chemical solution flow, a regulating valve for the chemical solution flow, means controlled by said meters for positioning said valve, and means for modifying the control of said last named means by said meters in accordance with the pH value of the sewage undergoing treatment.

11. In combination with apparatus for purifying a polluted liquid, a mixing tank, means for supplying the polluted liquid to the tank at an actual rate usually corresponding to an expected rate, means supplying a chemical solution to the tank, a meter of the rate of supply of polluted liquid, a meter of the rate of supply of chemical solution, means responsive to both of said meters controlling the rate of supply of chemical solution in predetermined proportion to the flow of polluted liquid, time cycle means varying said proportionality, means capable of modifying the flow of chemical solution upon departure of the actual flow of polluted liquid from the expected flow, and means responsive to a condition of the mixture of a polluted liquid and chemical solution regulating the introduction of a second solution to the mixture.

12. In combination with apparatus for purifying a polluted liquid, a mixing tank, means for supplying the polluted liquid to the tank, means supplying a chemical solution to the tank, a meter actuated by the polluted liquid as it is supplied to the tank, a meter actuated by the chemical solution as it is supplied to the tank, means responsive to both said meters and controlling the chemical solution flow in predetermined ratio to the flow of polluted liquid, and means actuated by the meter actuated by the polluted liquid for decreasing the said ratio when the flow of polluted liquid increases, and increasing the said ratio when the flow of polluted liquid decreases.

13. In combination with apparatus for purifying a polluted liquid, a mixing tank, means for supplying the polluted liquid to the tank, means supplying a chemical solution to the tank, a meter actuated by the polluted liquid as it is supplied to the tank, a meter actuated by the chemical solution as it is supplied to the tank, means responsive to both said meters and controlling the chemical solution flow in predetermined ratio to the flow of polluted liquid, clock driven means for varying said ratio over predetermined periods of time in predetermined cycles, means actuated by the meter actuated by the polluted liquid for decreasing the said ratio when the flow of polluted liquid increases and increasing the said ratio when the flow of polluted liquid decreases, and means also modifying the flow of chemical solution responsive to a condition of the mixture of polluted liquid and chemical solution.

AAGE F. NIELSEN.
WILLIAM L. PAULISON, Jr.